(12) United States Patent
Shin et al.

(10) Patent No.: US 9,414,050 B2
(45) Date of Patent: Aug. 9, 2016

(54) METHOD FOR DISPLAYING THREE-DIMENSIONAL INTEGRAL IMAGES USING MASK AND TIME DIVISION MULTIPLEXING

(71) Applicant: DONGSEO University Technology Headquarters, Busan (KR)

(72) Inventors: Dong-Hak Shin, Busan (KR); Yong-Seok Oh, Busan (KR); Byung-Gook Lee, Busan (KR)

(73) Assignee: Dongseo University Technology Headquarter, Busan (KR)

( * ) Notice: Subject to any disclaimer, the term of this patent is extended or adjusted under 35 U.S.C. 154(b) by 321 days.

(21) Appl. No.: 13/870,769

(22) Filed: Apr. 25, 2013

(65) Prior Publication Data
US 2014/0192171 A1 Jul. 10, 2014

(30) Foreign Application Priority Data
Jan. 8, 2013 (KR) .................. 10-2013-0001873

(51) Int. Cl.
*H04N 13/04* (2006.01)
(52) U.S. Cl.
CPC ....... *H04N 13/0406* (2013.01); *H04N 13/0413* (2013.01); *H04N 13/0422* (2013.01)

(58) Field of Classification Search
CPC .......... H04N 13/0055; H04N 13/0406; H04N 13/0413
See application file for complete search history.

(56) References Cited

U.S. PATENT DOCUMENTS

| 2002/0159167 | A1* | 10/2002 | Greenberg | G02B 5/005 359/738 |
| 2010/0142014 | A1* | 6/2010 | Rosen | G03B 35/02 359/1 |
| 2011/0179631 | A1* | 7/2011 | Gates | G02B 27/2292 29/592 |

* cited by examiner

*Primary Examiner* — Brian Yenke
*Assistant Examiner* — Justin Sanders
(74) *Attorney, Agent, or Firm* — Rabin & Berdo, P.C.

(57) ABSTRACT

A method for displaying three-dimensional integral images using a mask and a time division multiplexing which is configured in such a way that a three-dimensional image is displaced in a space as an element image obtained from a three-dimensional object is passed through a lenslet and a mask, the mask consisting of a blocking region through which an element image does not pass and a transmission region through which an element image passes, for thereby displaying three-dimensional images. The present invention is advantageous to play back a three-dimensional image the resolutions of which are enhanced in a depth-based integral imaging method using a time division display of an element image and a masked image.

2 Claims, 12 Drawing Sheets conventional method proposed method

METHOD FOR DISPLAYING THREE-DIMENSIONAL INTEGRAL IMAGES USING MASK AND TIME DIVISION MULTIPLEXING

TECHNICAL FIELD

The present invention relates to a method for displaying three-dimensional integral images using a mask and a time division multiplexing, and in particular to a method for displaying three-dimensional integral images using a mask and a time division multiplexing which is configured in such a way that a, three-dimensional image is displaced in a space as an element image obtained from a three-dimensional object is passed through a lenslet and a mask, the mask consisting of a blocking region through which an element image does not pass and a transmission region through which an element image passes, for thereby displaying three-dimensional images.

BACKGROUND ART

There are lots of researches working on a three-dimensional image and an image playback technology, which technology currently gathers huge interesting throughout the world.

The image-related technology advances more and more, so the images become highly integral.

Thanks to that, the three-dimensional images becomes realistic and look more natural as compared to a two-dimensional image, so needs for such three-dimensional images increase day by day.

The three-dimensional image playback technology is directed to a technology which enables an observer to enjoy a three-dimensional image, not a plane image, in more three-dimensional and actual-looking ways.

As a method for playing-back three-dimensional images, there are a stereoscopy method, a holography method and an integral imaging method, which advance over time.

The integral imaging method was developed in 1908 by Lippmann. Afterward, the integral imaging method is advancing to the next generation three-dimensional playback technology.

As a prior art of the above mentioned integral imaging method, there is a method for compressing element images with the aid of a region division technology using an element image compression device disclosed in Korean patent registration No. 0891160, which method comprises (a) obtaining an element image with a different parallax from a three-dimensional object through a lens array, (b) dividing into a similar region with a plurality of similar images depending on the similarity of the obtained element images; (c) rearranging the images included in each similar region to an one-dimensional element image arrangement, and (d) compressing the rearranged and generated one-dimensional element image arrangement.

As another example of the prior art, there is a method for recovering an integral image using an element image picked up through a lens array disclosed in Korean patent registration No. 0942271, which method comprises generating a recovery image by expanding the element image to a previously set size and combining the pixels positioned on the same coordinate of each expanded element image; measuring the blur matrix value of each recovery image; selecting as a focus image the recovery image corresponding to the inflection point of the blur matrix value based on a focus distance; generating an erosion image through an erosion computation, which computation means to subtract each pixel value of a corresponding erosion mask from each pixel value of the focus image; and mapping the erosion onto the recovery image.

FIG. 1 is a view illustrating a basic principle of the integral imaging method.

The principle of playing back a three-dimensional object 110 as a three-dimensional image 210 consists of an image acquisition step 100 for obtaining an element image 130 by letting a three-dimensional object 110 go through a lenslet 120, and an image playback step 200 for playing back the element image 100 obtained in the image acquisition step 100 as a three-dimensional image 210 in a space through the lenslet 220.

As shown in FIG. 1, the integral image technology consists of an image acquisition step 100 and an image playback step 200.

The image acquisition step 100 comprises a two-dimension detection unit like an image sensor and a lenslet 120. The three-dimensional object 110 is disposed in front of the lenslet 120.

Various image information of the three-dimensional object 110 pass through the lenslet 120 and are stored in the two-dimension detection unit.

At this time, the stored images are used for the sake of the playback of the three-dimensional image 210 as an element image 130.

The image playback step 200 of the integral image technology is performed in the way reverse to the image acquisition step 100 and is implemented with the image playback device like a LCD and the lenslet 220.

The element image 230 obtained in the image acquisition step 200 is displayed in the image playback device, and the image information of the element image 230 passes through the lenslet 220 and is played back as a three-dimensional image 210 in a space.

The element image 130 of the image acquisition step 100 and the element image 230 of the image playback step 200 are actually same, except that the element image 230 of the image playback step 200 is used for the sake of the playback of the three-dimensional image as the element image 120 obtained in the image acquisition step 100 is stored in the two-dimension unit. They are given different reference numerals in order to classify the image acquisition step 100 and the image playback step 200.

The direct imaging method is advantageous in that like the holography method, the full parallax and the continuous view timing can be provided.

The major features of the direct imaging method lie in that glasses or other tools are not necessary when observing three-dimensional images while providing continuous vertical and horizontal parallaxes within a certain viewing angle, not timing.

In addition, the direct imaging method is featured in that the full colors real-time image playbacks are possible and it is well compatible with the conventional flat image device.

FIG. 2 is a view illustrating a depth-based direct imaging method, and FIG. 3 is a view illustrating a resolution-based direct imaging method.

The above mentioned direct imaging method may be classified into two kinds depending on a distance "g" between the lenslet 220 and the element image display device.

In other words, it can be classified into two occasions, of which one occasion is when the distance "g" is the same as the focal distance "f" of the basic lens of the lenslet 220 and the other occasion is when it is not same.

When "g"="f", as shown in FIG. 2, one pixel of the element image 230 becomes parallel beam through the lens for thereby producing a direct beam.

The above mentioned occasion is called a depth-based direct imaging method, by which it is possible to make maximum the region of the depth indicating a three-dimensional image; however it is disadvantageous in that the resolution of the three-dimensional image 210 is low.

When "g" is not same as "f", it is called the resolution-based direct imaging method, in which one pixel of the element image 230 becomes a convergence beam through the lens for thereby generating a direct beam. In this case, the resolution of the three-dimensional image 210 can be increased; however the depth region decreases.

DISCLOSURE OF THE INVENTION

Accordingly, it is an object of the present invention to provide a method for displaying three-dimensional integral images using a mask and a time division multiplexing which makes it possible to display a three-dimensional image with an enhanced resolution in a depth-based direct imaging method using a time division multiplexing and masked image.

To achieve the above objects, there is provided a method for displaying three-dimensional integral images using a mask and a time division multiplexing, which makes it possible to display a tree-dimensional image in such a way that an element image obtained from a three-dimensional object is passed through a lenslet, thus displaying a three-dimensional image in a space, the mask consisting of a blocking region through which an element image does not pass, and a transmission region through which an element image can pass.

Advantageous Effects

The present invention is directed to a method for displaying three dimensional integral images using a mask and a time division multiplexing, which makes it possible to provide an enhanced resolution in a depth-based direct imaging method with the aid of a time division display of an element image and masked image.

In addition, the depth-based direct imaging method can provide a wider depth feeling, thus achieving a realistic three-dimensional image.

BRIEF DESCRIPTION OF THE DRAWINGS

The present invention will become better understood with reference to the accompanying drawings which are given only by way of illustration and thus are not limitative of the present invention, wherein.

MODES FOR CARRYING OUT THE INVENTION

Figure 1:
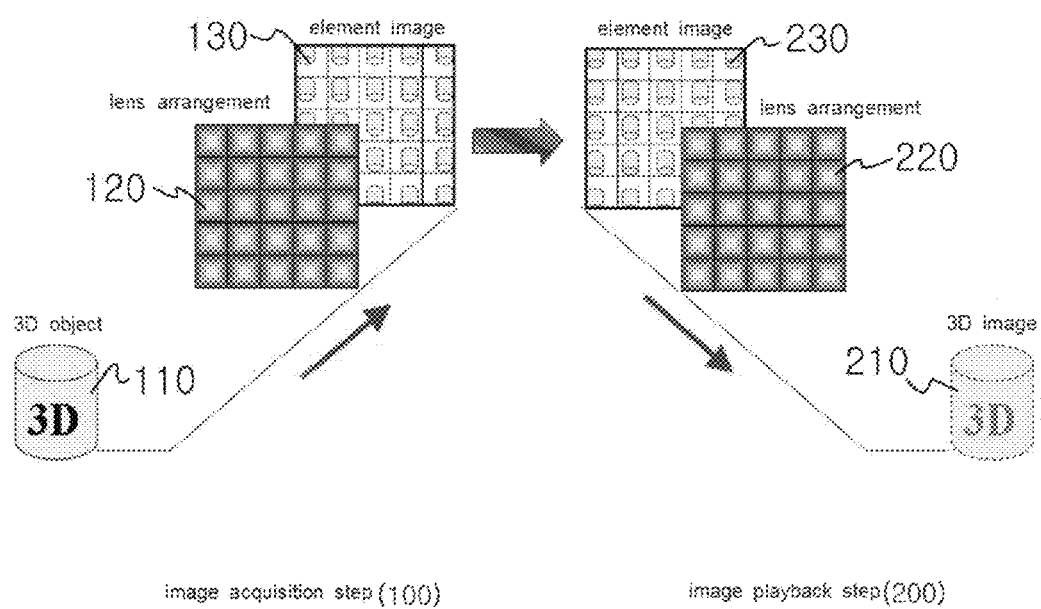
FIG. 1 is a view illustrating a basic principle of a direct imaging method.
Figure 2:
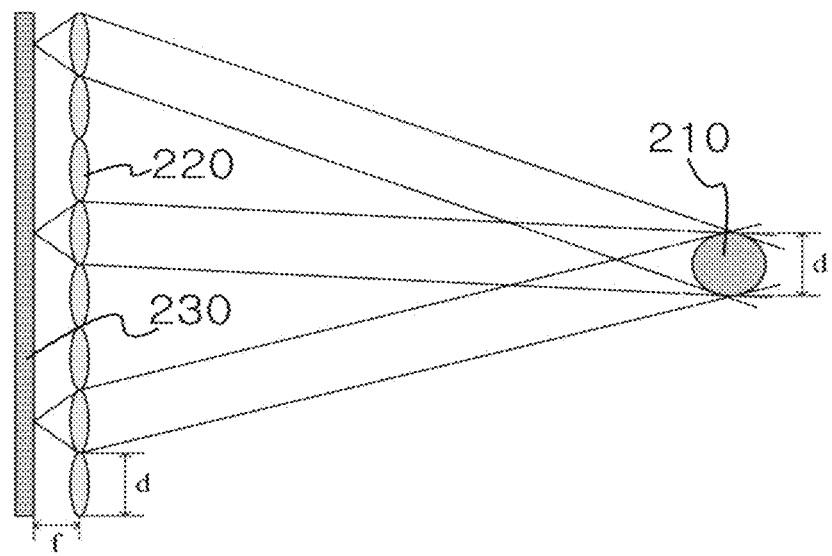
FIG. 2 is a view illustrating a depth-based direct imaging method.

The method for displaying three-dimensional integral images using a mask and a time division multiplexing according to the present invention has features in that element images 130 and 230 obtained from a three-dimensional object 110 are passed through a lenslet 220 and a mask 240 for thereby displaying a three-dimensional image 210 in a space. The mask 240 is formed of a blocking region 242 through which an element image 230 does not pass, and a transmission region 241 through which an element image 230 cannot pass for thereby displaying a three-dimensional image 210.

The mask 240 is configured in such a way that the positions of the transmission region 241 and the blocking region 242 alternate from each other over time in sequence for thereby displaying a three-dimensional image 210.

The method for displaying three-dimensional integral images using a mask and a time division multiplexing according to the present invention will be described in details with reference to the accompanying drawings.

Here, the lenslet is formed of a plurality of arranged microlenses.

Figure 3:
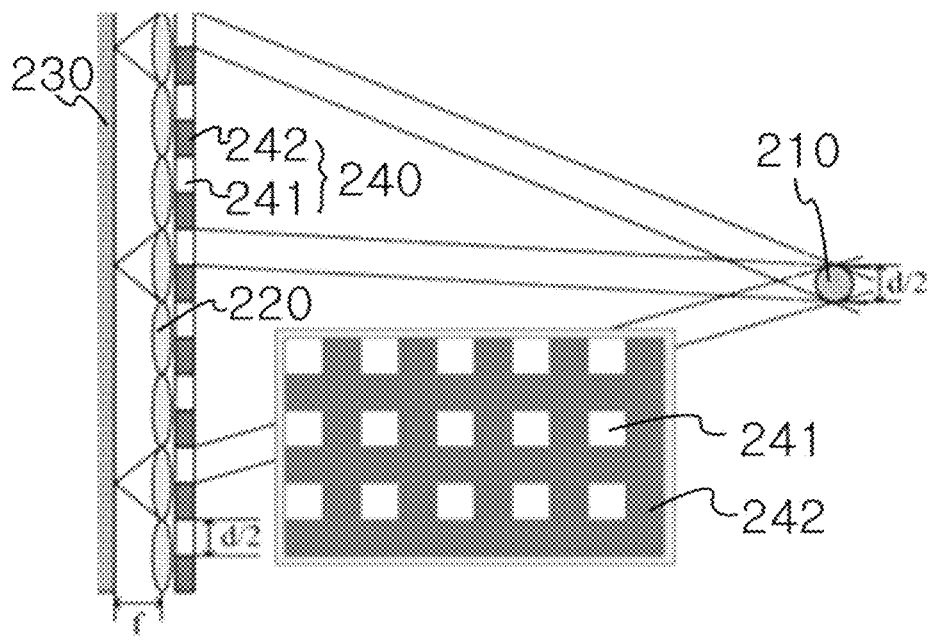
FIG. 3 is a view illustrating a resolution-based direct imaging method.
Figure 4:
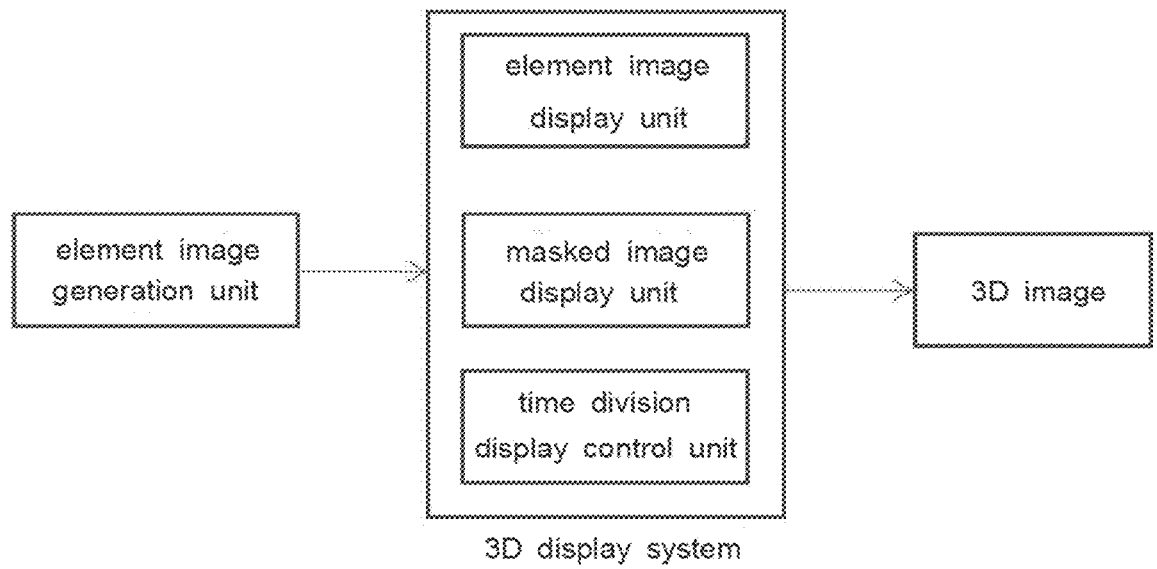
FIG. 4 is a view illustrating a three-dimensional direct imaging method using a time division display and a masked image according to the present invention.
Figure 5:
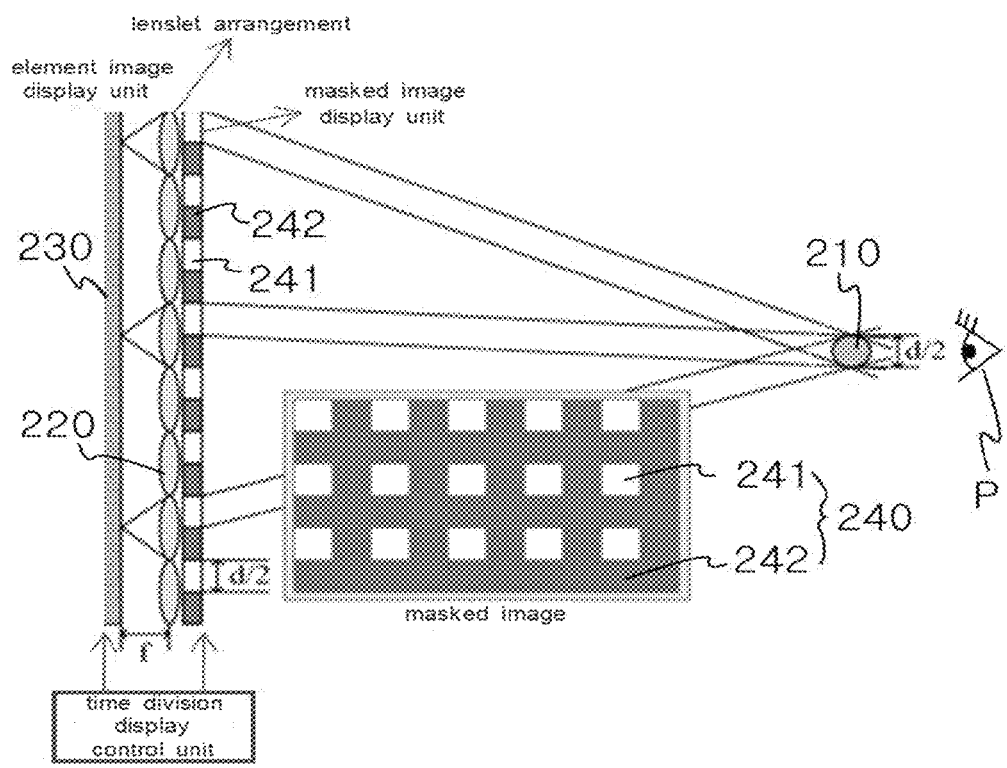
FIG. 5 is a view illustrating an experimental construction of FIG. 3.

FIG. 4 is a view illustrating a three-dimensional direct imaging method using a time division display and a masked image according to the present invention, and FIG. 5 is a view illustrating an experimental construction of FIG. 3.

The method for displaying three-dimensional integral images using a mask and a time division multiplexing according to the present invention has features in that element images 130 and 230 obtained from a three-dimensional object 110 are passed through a lenslet 220 and a mask 240 for thereby displaying a three-dimensional image 210 in a space. The mask 240 is formed of a blocking region 242 through which an element image 230 does not pass, and a transmission region 241 through which an element image 230 cannot pass for thereby displaying a three-dimensional image 210.

In particular, the mask 240 is configured in such a way that the positions of the transmission region 241 and the blocking region 242 alternate from each other over time in sequence for thereby displaying a three-dimensional image 210.

It is preferred that the blocking region 242 and the transmission region 241 are divided with equal ratio.

The positions of the blocking region 242 and the transmission region 41 alternate very fast, so the alternating scenes are not visible.

As shown in FIG. 4, The method for displaying three-dimensional integral images using a mask and a time division multiplexing according to an embodiment of the present invention comprises an element image generation unit, an element image display unit, a masked image display unit, a time division display control unit.

FIG. 5 is a view illustrating an experimental example of FIG. 4.

In the present embodiment of the present invention, the distance between the element image display unit and the lenslet 220 is fixed with "f" so as to implement the depth-based direct imaging method.

The element image display unit means a display panel in which the element image 230 is displayed.

In addition, the display panel used as the masked image display unit is disposed close to the lenslet 220.

There is provided a time division display control computer displaying both the element image 230 and the masked image corresponding to the same in a time division display way.

The present invention is directed to a method for obtaining an enhanced resolution of a three-dimensional image based on a depth-based direct imaging method.

As shown in FIG. 5, the present invention has features in that the resolution of the three-dimensional image 210 can be enhanced by performing a time division image display after an electronic mask 240 is disposed in front of a lenslet 220 about an observer "P".

"P" of FIG. 5 means an observer.

FIG. 5 is a view illustrating the principle of the resolution enhancement.

FIG. 5 shows an example of a 2×2 type time division display.

For this, one example of the masked image is shown in FIG. 5.

The beam from the element image 230 makes a three-dimensional image 210 in the space through the lenslet 220 and the mask 240.

The three-dimensional image 210 comes to have, in x-axis and y-axis directions, half the size of the image obtained by the conventional method, which means that the resolution is enhanced four times.

When the N×N number of the time division image displays are used, it is possible to obtain a N-times enhanced resolution in the way same as the above.

The element image generation unit is configured to obtain an element image 130 from the three-dimensional object 110 using a computer.

Figure 6:
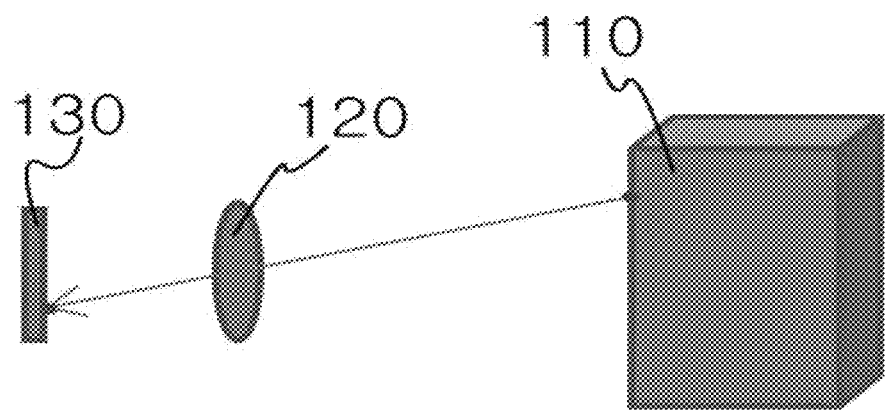
FIG. 6 is a view illustrating a method in which an element image is generated in a conventional way.
Figure 7:
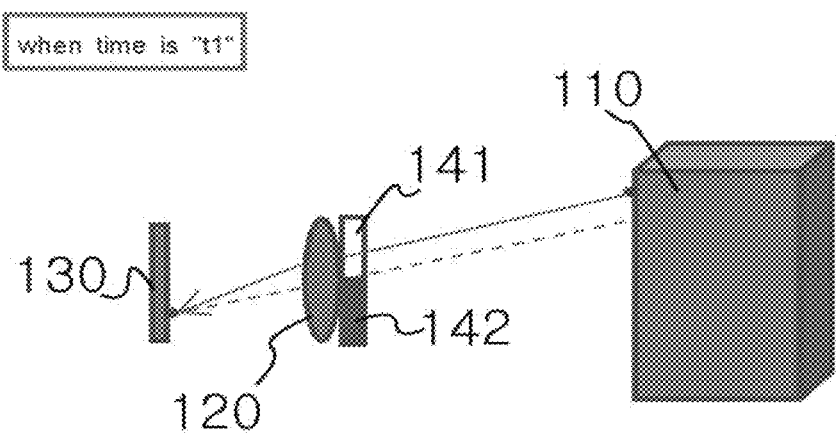
FIG. 7 is a view illustrating a method in which an element image is generated according to the present invention.
Figure 7:
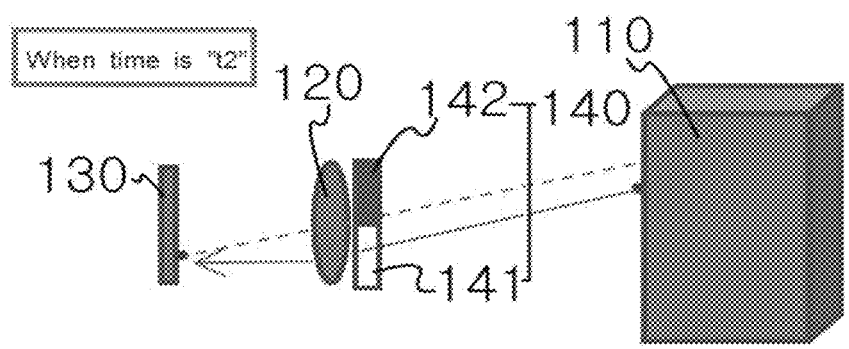

FIG. 6 is a view illustrating a method in which an element image is generated in a conventional way, and FIG. 7 is a view illustrating a method in which an element image is generated according to the present invention.

FIG. 6 is a view illustrating a generation of an image in a conventional method. The element image 130 generated in one lens of the lenslet 120 can be easily generated using a geometrical line in consideration of the positions of the lens and the pixel of the element mage.

At this time, beam passes through the center of the lens.

Different from the above, FIG. 7 is a view illustrating a method of generating an element image based on an employed mask method.

In this case, the center of the mask (140) is used whereas the conventional method uses the center of the lens.

Therefore, if the masked image changes, the positions of the generating images change.

The present invention can sample and obtain more information from the three-dimensional object 110 in such a way to use the time divided images.

Figure 8:
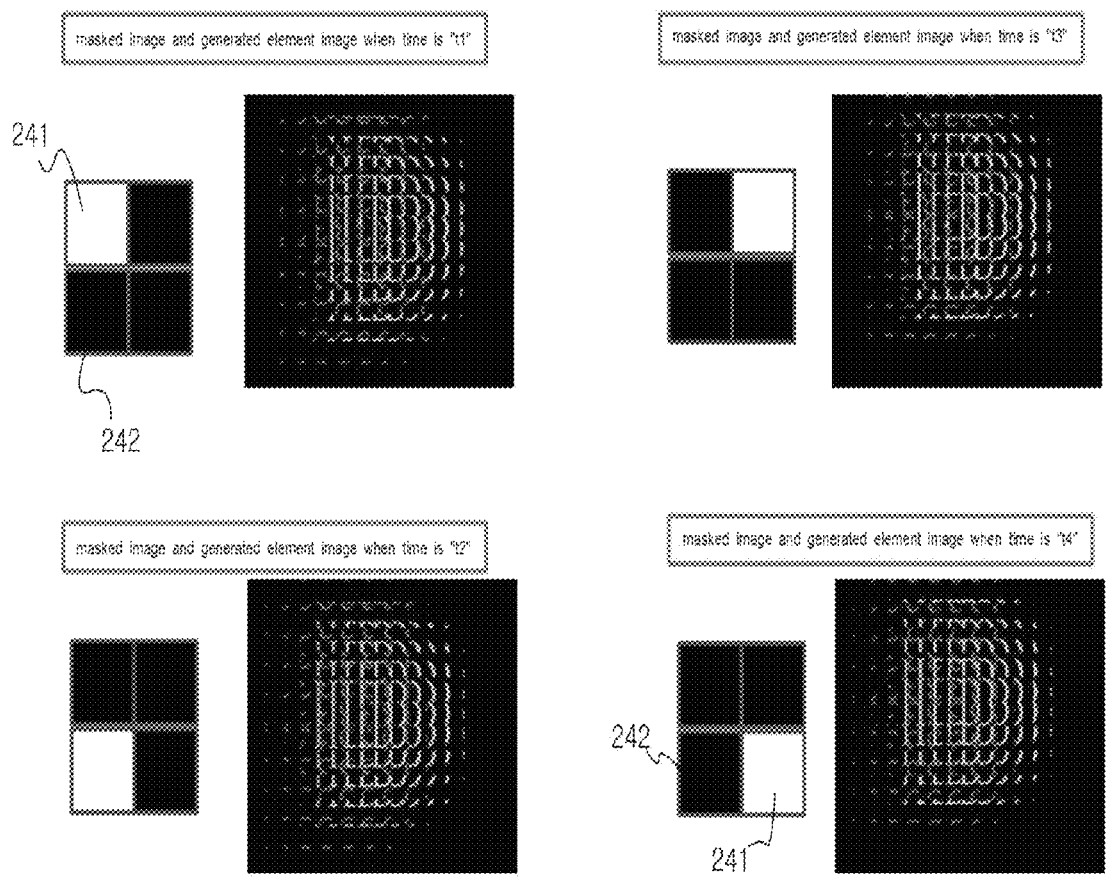
FIG. 8 is a view illustrating an element image generated according to the present invention.
Figure 9:
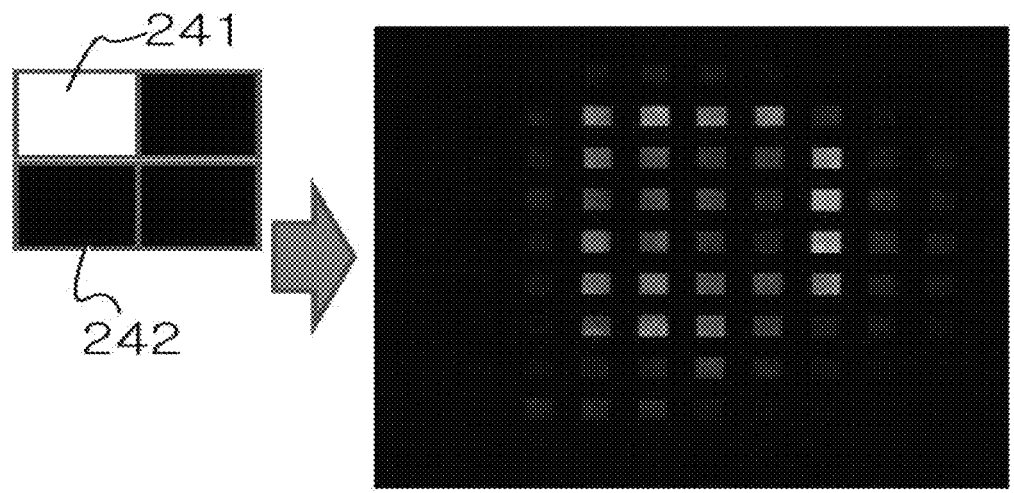
FIGS. 9, 10, 11 and 12 are views illustrating optical experiment images obtained through an optical experiment after a masked image and a corresponding element image are displayed on a display panel by the time.
Figure 10:
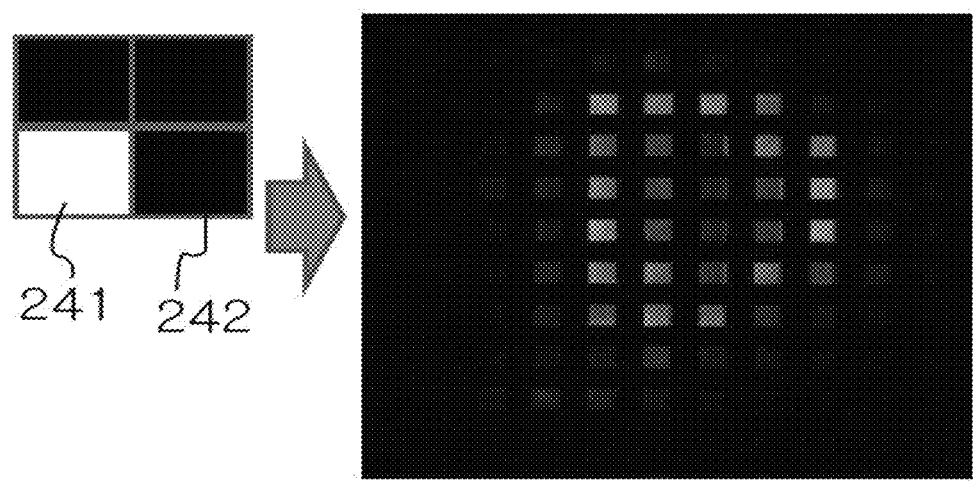
Figure 11:
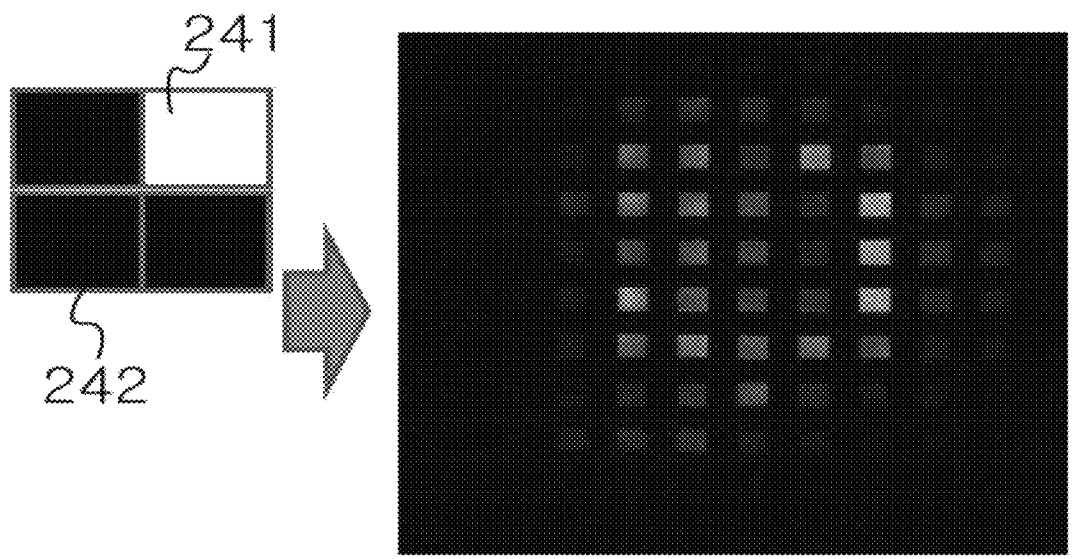
Figure 12:
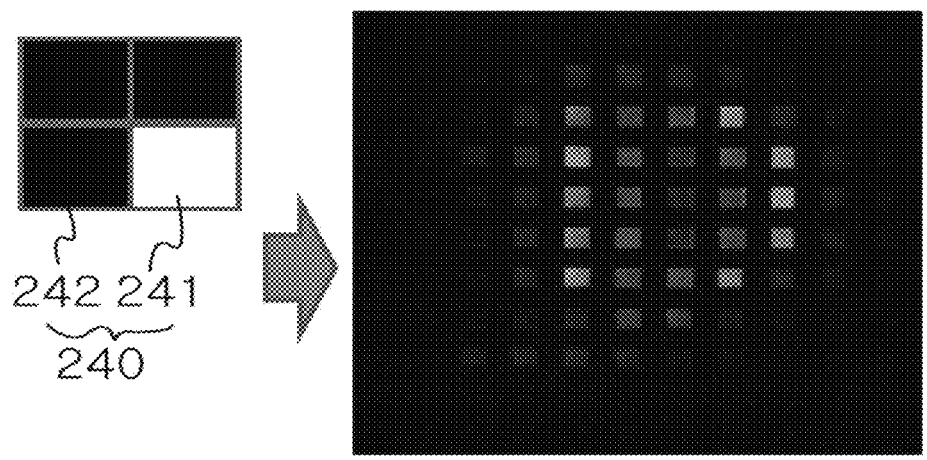

FIG. 8 is a view illustrating an element image generated according to the present invention.

As shown in FIG. 8, four kinds time division displays and masked images are used in the form of 2×2.

It is assumed that the time is t1, t2, t3, t4, the basic image of the masked image is made like in FIG. 6, and FIG. 6 shows the examples of sets of element images obtained using the masked images.

The three-dimensional image system, as shown in FIG. 4, comprises an element image display unit, a masked image display unit, and a time division display control unit.

The element image display unit is a device for displaying the sets of the element images generated by the element image generation unit, and it may be formed of a display panel or a projector and a screen.

The masked image display unit is a device displaying a masked image and may be formed of a transparent display panel.

At this time, the size of the masked image is determined depending on the diameter of the basic lens, and in case of the N×N time division multiplexing, the size of the masked image decreases to 1/N of the diameter of the basic lens.

In addition, the time multiplexing display control unit is configured to control the element image display unit and the masked image display unit while synchronizing them with a computer, so the element images and the masked images can be fast displayed based on the time multiplexing.

FIGS. 9 to 12 are views illustrating optical experimental images showing a masked image and a corresponding element image by the time.

In other words, FIGS. 9 to 12 show the results of the experiments obtained through the optical experiments after the masked image and corresponding image are displayed in the panel by the time in the three-dimensional image system.

At the time "t1", the beam passes through the first region among the four regions corresponding to one lens, and the remaining regions block the beam.

The element images can be viewed in the form of a three-dimensional image through the thusly configured masked images.

Since the masked image is formed of four regions, in case of the time division, it can be displayed with four times "t1", "t2", "t3", "t4", so different observing images can be obtained.

Figure 13:
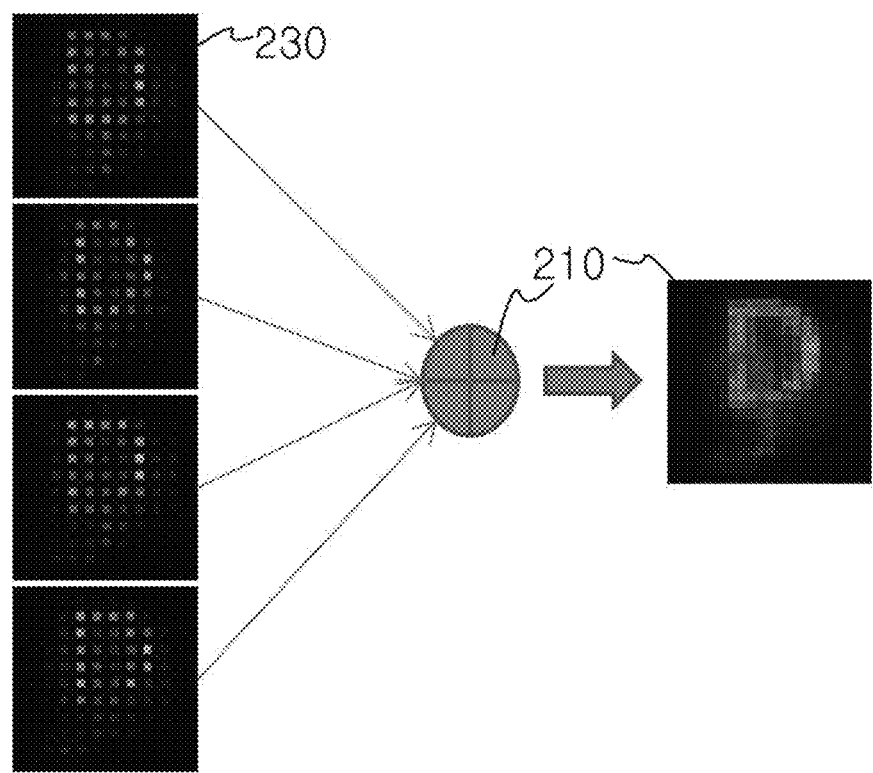
FIG. 13 is a view illustrating an optical experiment image obtained by displaying at a high speed the images obtained in the operations of FIGS. 9 to 12 based on a time division method.

FIG. 13 is a view illustrating an optical experiment image obtained by displaying at a high speed the images obtained in the operations of FIGS. 9 to 12 based on a time division method.

In other words, FIG. 13 shows a result obtained when the observing images obtained in FIGS. 9 to 12 are displayed at high speed based on the adapted time division technology.

When the images are displayed at high speed, each region of the images are simply combined, and an observer can see a completed three-dimensional image like the right side image of FIG. 13.

Figure 14:
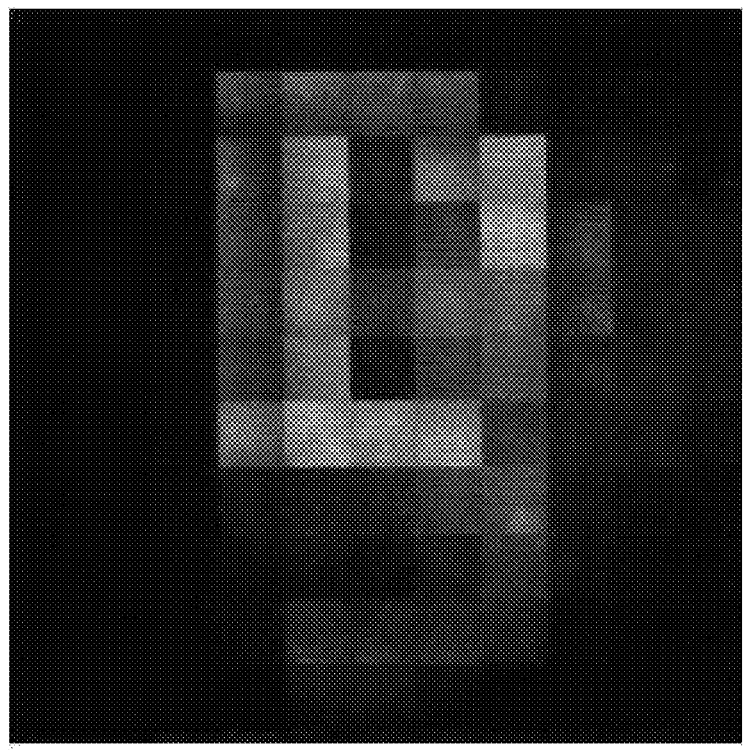
FIG. 14 is a view illustrating an optical experimental image generated by a conventional method.
Figure 15:
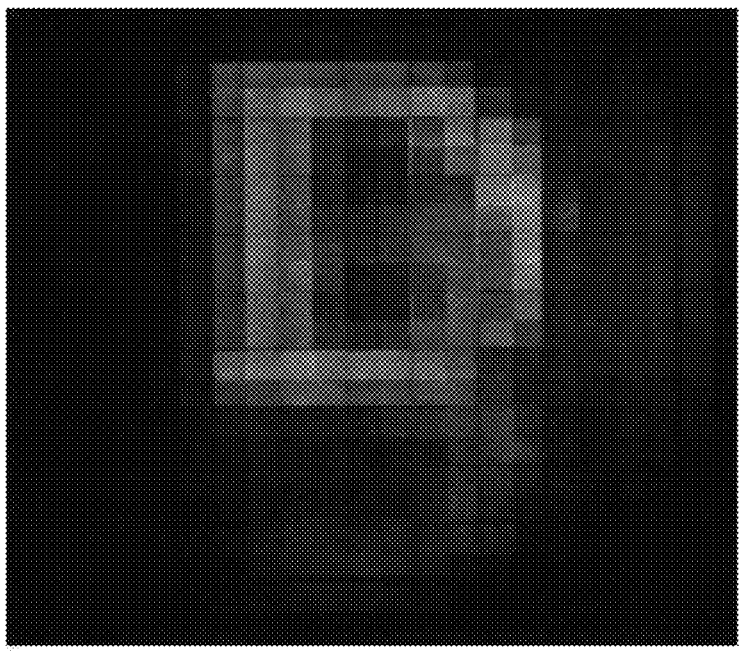
FIG. 15 is a view illustrating an optical experimental image generated according to the present invention.

FIG. 14 is a view illustrating an optical experimental image generated by a conventional method.

In the conventional method as shown in FIG. 14, it is known that a block image as large as one lens is obtained.

Meanwhile, in the present invention, as shown in FIG. 9B, since the size of one lens is time divided into four parts, it is possible to obtain a three-dimensional image of which the resolution is enhanced four times.

Figure 16:
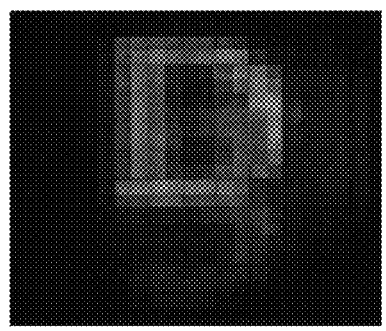
FIG. 16 is a view illustrating an optical experimental image obtained from at various observing angles with respect to a three-dimensional image generated according to the present invention.
Figure 16:
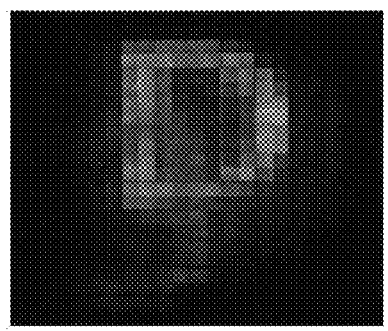
Figure 16:
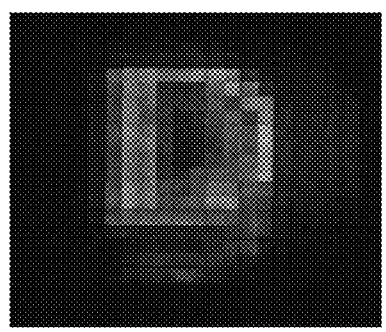
Figure 16:
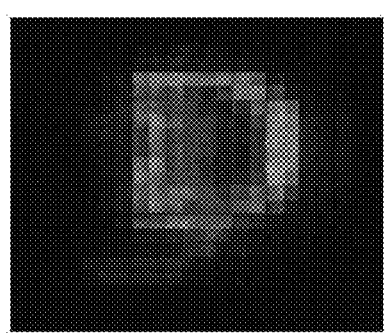

FIG. 16 is a view illustrating an optical experimental image obtained from at various observing angles with respect to a three-dimensional image generated according to the present invention.

As shown in FIG. 16, it shows results obtained at different angles with respect to the three-dimensional images obtained according to the present invention.

It is confirmed that the three-dimensional effects can be obtained at different angles.

Figure 17:
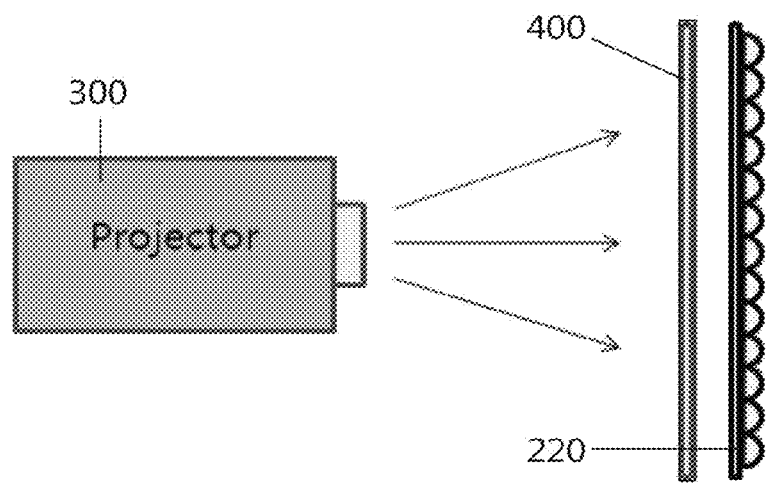
FIG. 17 is a view illustrating a construction of a projector and a diffusion plate in an image playback step.
Figure 18:
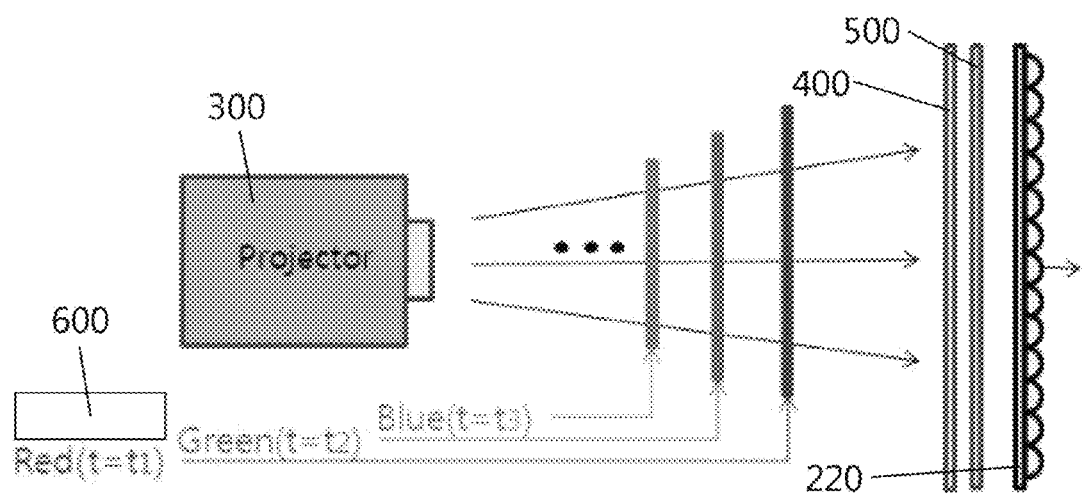
FIG. 18 is a view illustrating a construction of a projector and a diffusion plate and a black and white LC panel in an image playback step.

FIG. 17 is a view illustrating a construction of a projector and a diffusion plate in an image playback step, and FIG. 18 is a view illustrating a construction of a projector and a diffusion plate and a black and white LC panel in an image playback step.

As shown in FIG. 17, the projector 300 is configured in the image playback step 200, and the diffusion plate 400 is disposed between the lenslet 220 and the projector 300 for thereby playing back a three-dimensional image.

The projector 300 is equipped with a typical device capable of enlarging the image and displaying on a screen, and the diffusion plate 400 is formed of a semi-transparent element which makes it possible to diffuse the beam from the light source along the surfaces while making the brightness of the beam uniform over the entire surfaces. In case of the commercial board formed of multiple fluorescent lamps, the acryl plates serve as the diffusion plate.

Here, the optical diffusion plate or a diffusion plate made in a film type or with a high purity acryl resin material may be used for the same purpose or a high intensity prism diffusion plate which is a new plate may be used.

The high intensity prism diffusion plate is configured in such a way that a pattern is printed on each side of the same, not one side printing like the conventional method. In other words, a high intensity diffusion plate technique is actually adapted, in which on each side is printed a pattern which is shaped like a pyramid and a semi-spherical shape.

However, the conventional LCD panel has features in that for a LCD, a backlight color is white and is formed in a RGB structure of a glass material, so Moire phenomenon occurs frequently.

The above mentioned Moire phenomenon occurs when a beating phenomenon becomes visible, so a new pattern unintended appears, like an interference fringe occurs between the objects disposed at a regular interval, in other words, when at least two patterns are overlapped.

Here, the beating phenomenon means that the frequency width changes with a certain cycle depending on the difference of two frequencies as two waves with similar frequencies affect to each other.

As an example of Moire phenomenon, there is a phenomenon that a rainbow color pattern is formed in a gap of the structure during the photographing or a phenomenon that a ripple pattern is formed when a mosquito net or a curtain is folded when it is sunny.

In order to resolve the color filter problem of causing Moire phenomenon, the white and black LC panel 500 is actually adapted instead of the conventional LCD panel, and as shown in FIG. 18, the white and black LC panel 500 is disposed between the lenslet 220 and the diffusion plate 400.

Therefore, three images formed of a red color, a green color and a blue color over the entire screen are passed through the diffusion late 400 in time sequence (t=t1, t2, t3 . . . ) and are fast displayed on the white and block LC panel 800, thus generating a color element image arrangement.

The typical RGB projector 600 is used so as to project a red color, a green color and a blue color in sequence. As shown in FIG. 18, the panel with a red color, a green color and a blur color is used so as to explain that the red color, the green color and the blue color are projected in sequence. Actually speaking, the images of the red color, the green color and the blur color are sequentially projected onto one panel.

In other words, the images of the t1=red color, the t2=green color and the t3=blur color generated by the RGB projector 600 and then the t4=red color, t3=green color and the t4=blue color pass through the diffusion plate 400 in sequence and are displayed on the white and black LC panel 500.

The thusly constructed image display device is called a BLU (Backlight Unit). The flat panel type PDP, LCD, LED, OLED, etc. which are currently on the markets may be selectively used without any limitations to the space.

As described above, the present invention is advantageous to playback the three-dimensional images the resolutions of which are enhanced in the depth-based integral imaging method using the time division display and masked image of the element images.

In addition, since the depth-based integral imaging method provides a deep and wide depth effect, a more realistic three-dimensional image can be played back.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for displaying three-dimensional integral images by
a first mask disposed to front on a three-dimensional object and having a blocking region and a transmission region, the first mask passing images of the three-dimensional object through the transmission region of the first mask,
a first lenslet array closely contacted to a side of the first mask, through which the images of the three-dimensional object from the first mask pass,
a two-dimensional detection unit receiving and storing the images from the first lenslet array,
a second lenslet array disposed separately from the first lenslet array, through which the images from the two-dimensional detection unit pass, and
a second mask disposed separately from the first mask and closely contacted to a side of the second lenslet array and having a blocking region and a transmission region, comprising:
transmitting, by the first mask, the images from the three-dimensional object to the first lenslet array, wherein the images pass through the transmitting region of the first mask but are blocked by the blocking region of the first mask in a way of a time division multiplexing;
transmitting, by the first lenslet array, the images from the first mask to the two-dimensional detection unit;
receiving and storing, by the two-dimensional detection unit, the images from the first lenslet array;
transmitting, by the second lenslet array, the images from the two-dimensional detection unit to the second mask; and
transmitting, by the second mask, the images from the second lenslet array to a space for displaying, wherein the images pass through the transmitting region of the second mask but are blocked by the blocking region of the second mask in a way of a time division multiplexing, thereby displaying the three-dimensional image in the space,
wherein the images are transmitted through in order of the first mask, the first lenslet array, the two-dimensional detection unit, the second lenslet array and the second mask, to the space for displaying.

2. The method of claim 1, wherein the first and second masks are configured in such a way that positions of the blocking region and the transmission region alternate in sequence.

\* \* \* \* \*